United States Patent [19]

Townsend

[11] Patent Number: 4,920,611
[45] Date of Patent: May 1, 1990

[54] METHOD AND MEANS FOR ENCASING MEAT PRODUCTS

[75] Inventor: Ray T. Townsend, Des Moines, Iowa

[73] Assignee: Townsend Engineering Company, Des Moines, Iowa

[21] Appl. No.: 338,858

[22] Filed: Apr. 17, 1989

[51] Int. Cl.⁵ .............................................. A22C 11/02
[52] U.S. Cl. ........................................ 17/49; 17/35; 17/41; 53/434; 222/252
[58] Field of Search ................... 17/34, 33, 35, 49, 41, 17/42; 53/434, 432, 530, 122, 512, 479; 222/252, 334

[56] References Cited

U.S. PATENT DOCUMENTS

| | | | |
|---|---|---|---|
| 3,473,190 | 10/1969 | Kielsmeier et al. | 17/35 |
| 4,646,386 | 3/1987 | Dreisin | 17/35 |
| 4,672,793 | 6/1987 | Terlizzi, Jr. et al. | 17/49 |
| 4,817,244 | 4/1989 | Townsend | 17/35 |

Primary Examiner—Willis Little
Attorney, Agent, or Firm—Zarley, McKee, Thomte, Voorhees & Sease

[57] ABSTRACT

A method for encasing a meat product and removing air particles therefrom by forcing a plastic meat emulsion through a stuffing horn having an exit end with an elongated casing slidably mounted in close spaced relationship on the horn so that the meat emulsion extruded through the exit end of the horn will fill the elongated casing adjacent the exit end. The space between the exit end of the horn and the casing is subjected to a negative pressure so that air in that space is removed, and so that air in the meat emulsion extruded through the exit end will be removed. A machine for encasing meat products comprising a frame, a pump means on the frame for pumping meat emulsion under pressure, and a hollow elongated stuffing horn connected to the pump means so that meat emulsion under pressure can flow into the stuffing horn. The stuffing horn has an exit end, and is adapted to telescopically receive an elongated casing on its outer surface with the casing being adapted to be filled with meat emulsion extruded from the exit end of the stuffing horn. A vacuum means adapted to be connected to the space between the casing and the outer surface of the stuffing horn is provided to remove air from between the exit end of the horn and the casing and to remove air from meat emulsion extruded from the exit end of the horn into the casing.

11 Claims, 3 Drawing Sheets

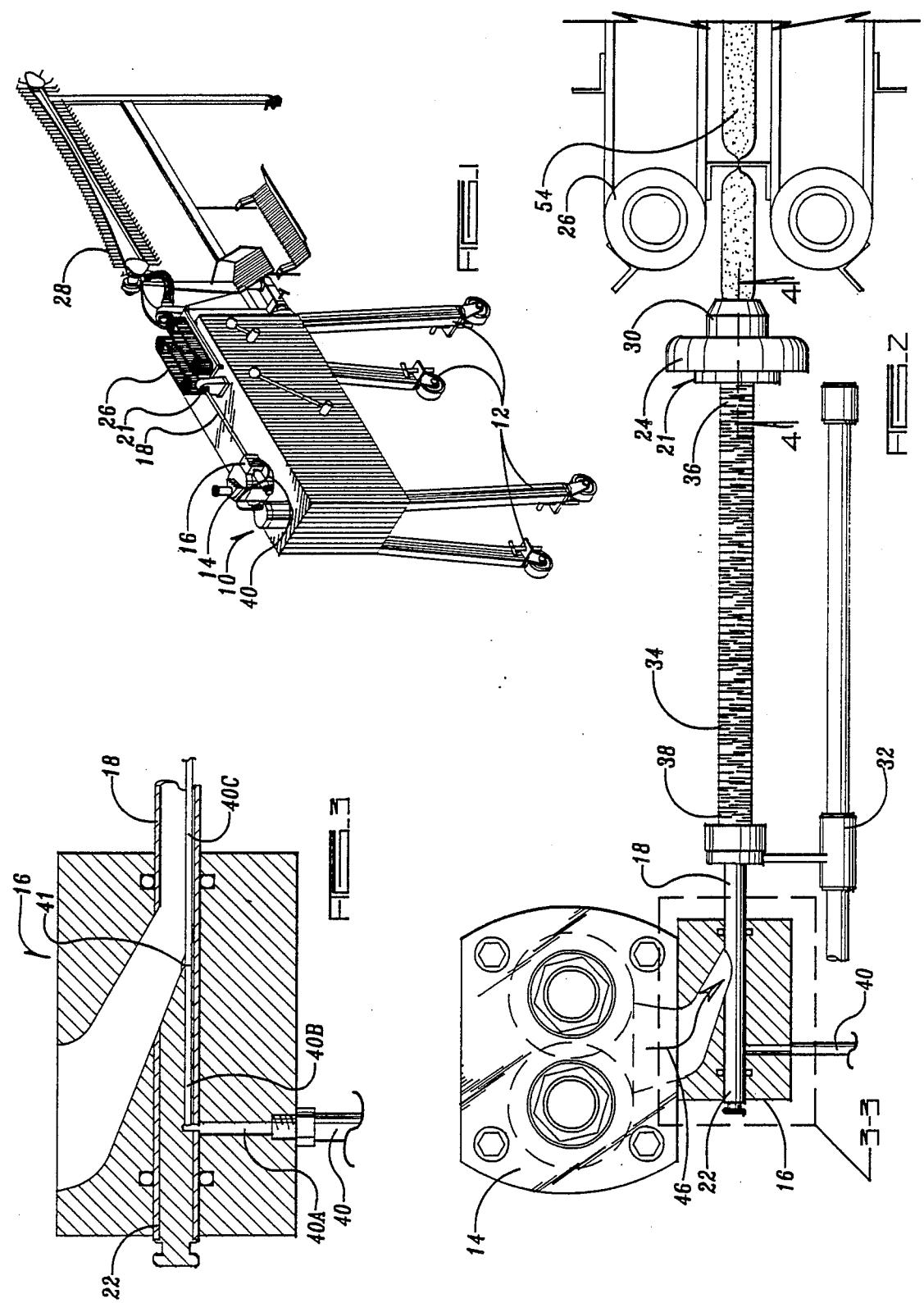

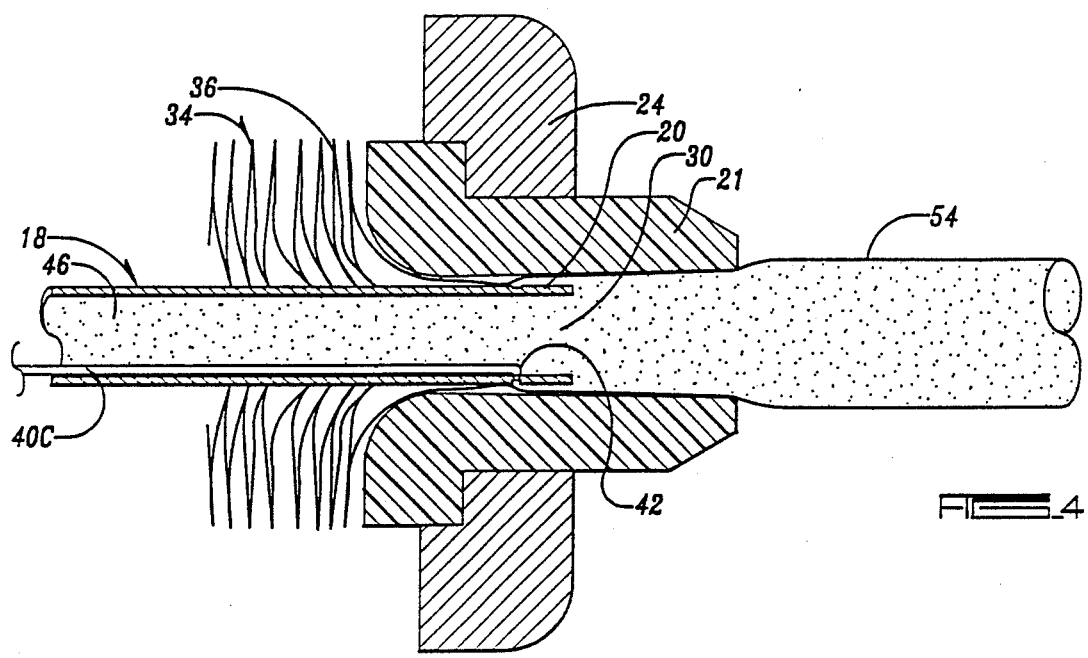
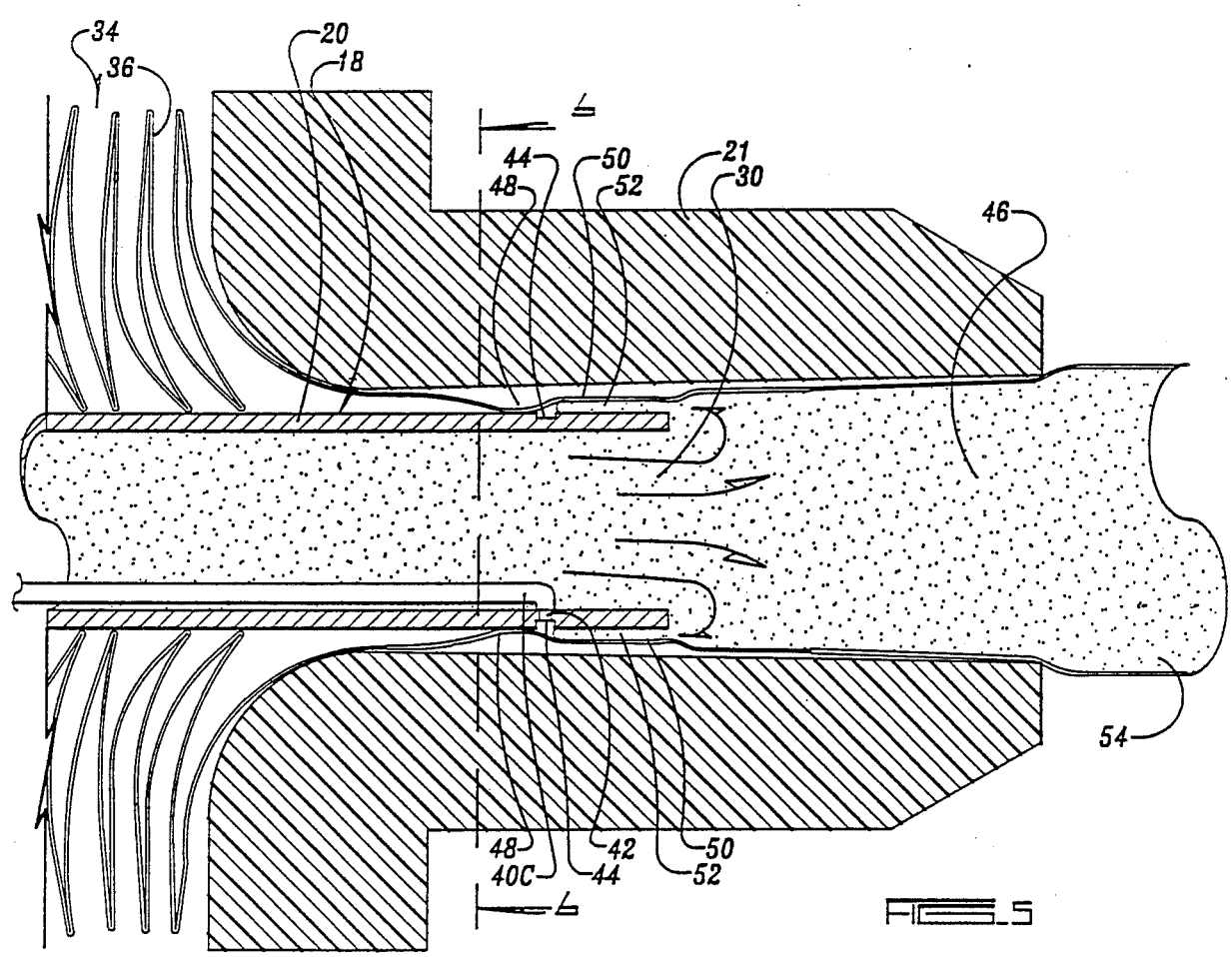

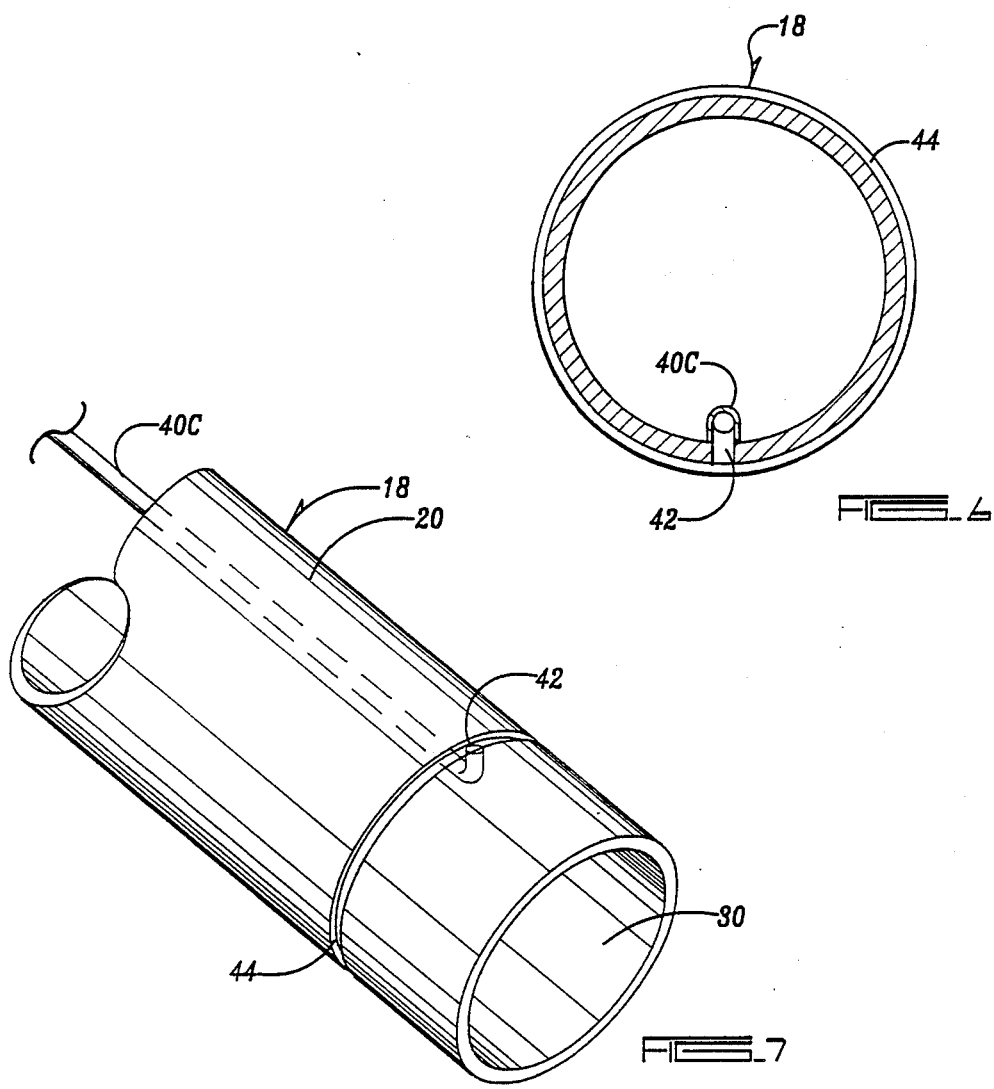
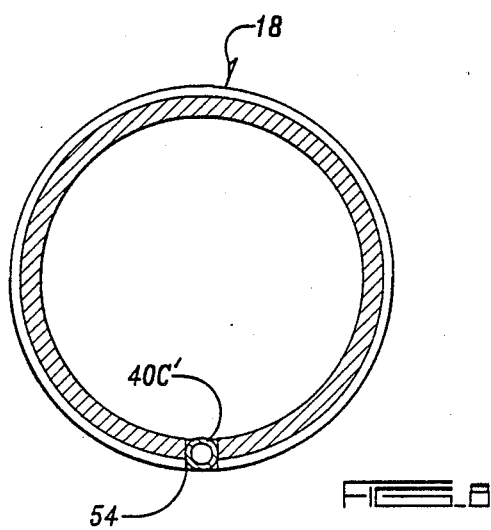

METHOD AND MEANS FOR ENCASING MEAT PRODUCTS

BACKGROUND OF THE INVENTION

In spite of substantial advances in the art of encasing meat emulsion in tubular casings, small air bubbles exist in the meat and in wrinkles within the casing. These air bubbles shorten the shelf life of the meat.

Some large meat processing machines, (blenders, choppers, etc.) use a vacuum system in an effort to get the air out of the meat processed therein. However, when the meat emulsion processed in such machines is mixed to facilitate the air removal process, the meat is damaged.

Therefore, a principal object of this invention is to provide a method and means for encasing meat products wherein air bubbles in both the meat emulsion and in the casing will be effectively removed so that the finished encased meat product will be substantially free from air bubbles either in the meat or the casing.

These and other objects will be apparent to those skilled in the art.

SUMMARY OF THE INVENTION

The method of this invention involves encasing a meat product and removing air particles therefrom by forcing a plastic meat emulsion through a stuffing horn having an exit end with an elongated casing slidably mounted in close spaced relationship on the horn so that the meat emulsion extruded through the exit end of the horn will fill the elongated casing adjacent the exit end. The space between the horn and the casing is subjected to a negative pressure so that any air in the space between the casing and the meat emulsion extruded through the exit end will be removed.

The apparatus of this invention entails a machine for encasing meat products comprising a frame, a pump means on the frame for pumping meat emulsion under pressure, and a hollow elongated stuffing horn connected to the pump means so that meat emulsion under pressure can flow into the stuffing horn. The stuffing horn has an exit end, and is adapted to receive an elongated casing on its outer surface with the casing being adapted to be filled with meat emulsion extruded from the exit end of the stuffing horn. A vacuum tube extends through the stuffing horn and is adapted to be in communication with the outer surface of the stuffing horn. The vacuum tube removes air from between the exit end of the horn and the casing, and removes air from meat emulsion extruded from the exit end of the horn into the casing.

BRIEF DESCRIPTION OF THE DRAWINGS

FIG. 1 is a perspective view of the meat encasing machine of this invention.

FIG. 2 is a schematic plan view of the primary meat encasing components shown at an enlarged scale.

FIG. 3 is an enlarged scale sectional view taken on line 3—3 of FIG. 2.

FIG. 4 is an enlarged scale sectional view taken on line 4—4 of FIG. 2.

FIG. 5 is an enlarged scale sectional view taken on line 5—5 of FIG. 4.

FIG. 6 is a sectional view taken on line 6—6 of FIG. 5.

FIG. 7 is a partial perspective view of the discharge end of the stuffing horn shown at an enlarged scale.

FIG. 8 is a sectional view similar to that of FIG. 6 but showing an alternate form of the invention as it pertains to the vacuum line.

DESCRIPTION OF THE PREFERRED EMBODIMENT

The meat encasing machine 10, except for special components of this invention to be described hereafter, is essentially disclosed in U.S. Pat. No. 3,115,668. The machine 10 involves four supporting legs 12, a meat emulsion pump 14 connected to a source of meat emulsion (not shown). A conventional stuffing horn block 16 is attached to pump 14, and stuffing horn 18 slidably extends through block 16. The stuffing horn 18 has a forward exit end 20 and a rearward end 22.

A conventional chuck 21 is mounted on machine 10 within a conventional chuck housing 24. Conventional linker 26 is mounted on machine 10 forwardly of chuck 21. A conventional conveyor 28 is connected to machine 10 downstream from discharge horn 30. A conventional slidable follower rod 32 is connected to machine 10 and is adapted, as will be described hereafter, to slidably move a shirred casing 34 forwardly on stuffing horn 18. The casing 34 has a forward end 36 and a rearward end 38.

The foregoing structure is all conventional on prior art machines, and the structure described does not, of itself, comprise the instant invention.

Conventional meat encasing machines permit the withdrawal of stuffing horn 18 in a rearward direction through block 16 to permit the exit end 20 of the stuffing horn to withdraw rearwardly from chuck 21. The shirred casing 34 can then be telescopically mounted upon the horn 18, with the forward end 36 of the casing being pulled through chuck 21. Conventionally, meat under pressure is extruded from the exit end of the horn into the casing, and the casing is progressively pulled through the chuck as the filled links 54 are created. Chuck 21 rotates the casing, and the separate links are created by linker 26 in conventional manner. Conventionally, the meat emulsion 46 is extruded at a pressure between 100 and 600 psi.

A vacuum line 40A connected to the vacuum pump (not shown) extends into stuffing horn block 16 where it enters the rearward end of stuffing horn 18. Line 40A then connects with line 40B which extends longitudinally forwardly towards the exit end of the horn. Solder joint 41 connects lines 40B and 40C. As best shown in FIG. 5, line 40C terminates adjacent point 42 which connects line 40 with annular groove 44 on the outside of the forward exit end of the horn 18. The lines 40B and 40C should preferrably dwell against the interior side wall surface of the horn 18.

With reference to FIG. 5, when meat emulsion 46 moves through horn 18, and when a vacuum is pulled on lines 40A, 40B and 40C, the negative pressure around groove 44 tends to pull the segment 48 of casing 34 into tight engagement with the outer surface of horn 18 adjacent and rearwardly of the groove 44. However, the pressure of the meat emulsion exiting horn 18 forces the segment 50 of casing 34 outwardly from the surface of horn 18 (forwardly of groove 44) which exposes the meat emulsion in the area 52 to negative pressure. As a result, the air bubbles in area 52, either within the meat emulsion within area 52 or elsewhere in the area 52 (if the area is not completely filled) will be withdrawn by the vacuum into vacuum line 40C.

The vacuum line 40C' in FIG. 8 is comprised on an longated slot 54 in stuffing horn 18 into which a hollow vacuum tube 56 is inserted and soldered in place. The line 40C' can terminate at point 42 just as did line 40C (FIG. 7), and is connected at its other end to line 40B at joint 41 (FIG. 3). This construction of line 40C' facilitates cleaning of the horn 18. No annular groove 44 is used with line 40C'.

This elimination or substantial reduction of air in the forward part of the casing, and in the exiting meat emulsion, greatly enhances the resulting meat product, including its shelf life.

Therefore, it is seen that this invention will achieve at least all of its stated objectives.

I claim:

1. The method of encasing a meat product and removing air therefrom;
   forcing a plastic emulsion through a stuffing horn having an exit end with an elongated casing member mounted thereon in close spaced relationship so that said emulsion extruded through said exit end will fill said elongated casing adjacent said exit end;
   subjecting the space between the exit end of said horn and said casing to a negative pressure so that air between said horn and said casing, and air in said emulsion extruded through said exit end will be removed to make said filled casing substantially free from air particles.

2. The method of claim 1 wherein said elongated casing is in a shirred condition on said horn and has a forward end adjacent said exit end and a rearward end, and subjecting the space between said horn and the forward end of said casing to a negative pressure.

3. The method of encasing an emulsion product by simultaneously extruding an emulsion product into an elongated casing through the exit end of a stuffing horn, and subjecting the emulsion product to a negative pressure as it enters said casing to remove air particles from said emulsion product.

4. The method of claim 3 wherein said casing is slidably mounted in close spaced relationship on said horn, and said space between the exit end of said horn and said casing is subjected to said negative pressure to remove air from between said casing and said horn.

5. The method of claim 4 wherein said negative pressure is created by pulling a vacuum from a vacuum line within said stuffing horn which is in communication with an opening on the outer surface of said stuffing horn adjacent the exit end thereof, and causing said casing to closely adhere to the surface of said stuffing horn on the side of said opening opposite to the exit end of said stuffing horn to seal the interior of said casing from said negative pressure except adjacent the exit end of said stuffing horn.

6. A machine for encasing emulsion products, comprising: a frame;
   pump means on said frame for pumping emulsion under pressure;
   a hollow elongated stuffing horn connected to said pump means so that emulsion under pressure can flow into said stuffing horn, said stuffing horn having an exit end and a rearward end;
   said stuffing horn adapted to receive an elongated casing on its outer surface; said casing adapted to be filled with said emulsion extruded from said exit end of said stuffing horn;
   and a vacuum means adapted to be connected to the space between said casing and the outer surface of said stuffing horn adjacent the exit end thereof to remove air between the exit end of said horn and said casing and to remove air from meat emulsion extruded from said exit end into said casing.

7. The machine of claim 1 wherein said vacuum means is connected to an elongated vacuum line extending longitudinally through said stuffing horn.

8. The machine of claim 7 wherein said stuffing horn has an annular groove on the outer surface thereof adjacent its exit end, with said annular groove being in communication with said vacuum line.

9. The machine of claim 7 wherein said vacuum line has a diameter substantially less than the diameter of said stuffing horn, and wherein said vacuum line is positioned adjacent the inner surface of said stuffing horn.

10. The machine of claim 1 wherein said vacuum means is connected to an elongated vacuum line extending longitudinally along said stuffing horn.

11. The machine of claim 10 wherein said vacuum line is an elongated tube extending through and secured within an elongated slot in said stuffing horn.

* * * * *